United States Patent
Ito et al.

(10) Patent No.: US 6,617,741 B2
(45) Date of Patent: Sep. 9, 2003

(54) COMMUTATOR FOR ELECTRIC ROTARY MACHINE AND MANUFACTURING METHOD THEREOF

(75) Inventors: Motoya Ito, Hekinan (JP); Kiyonori Moroto, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/085,089

(22) Filed: Mar. 1, 2002

(65) Prior Publication Data

US 2002/0121833 A1 Sep. 5, 2002

(30) Foreign Application Priority Data

Mar. 2, 2001 (JP) ........................................ 2001-058721

(51) Int. Cl.[7] .............................................. H02K 13/00
(52) U.S. Cl. ........................................ 310/233; 310/204
(58) Field of Search ............................... 310/233, 235, 310/204; H02K 13/00

(56) References Cited

U.S. PATENT DOCUMENTS 6,181,046 B1 * 1/2001 Daikoku et al. ............ 310/236
6,259,183 B1 * 7/2001 Hotta et al. ................. 310/233

FOREIGN PATENT DOCUMENTS

| JP | 11-187622 | 7/1999 |
| JP | 11-187623 | 7/1999 |

* cited by examiner

*Primary Examiner*—Nestor Ramirez
*Assistant Examiner*—Hanh Nguyen
(74) *Attorney, Agent, or Firm*—Nixon & Vanderhye, P.C.

(57) ABSTRACT

A commutator having even number (2n) of commutator segments and n segment pairs, each pair consisting of two commutator segments positioned symmetrically with respect to a commutator center, is mounted on a rotor of an electric rotary machine. The commutator segments are electrically insulated from one another, while the commutator segments in each pair are electrically connected to each other. A metallic base plate and a carbon segment plate are molded together with resin, and then the commutator segments are separated into individual segments. Connecting portions for electrically connecting the commutator segments in each pair are formed integrally with the metallic base plate at positions depressed from a surface of the metallic base plate, so that the connecting portions are not cut in the process of separating the segment plate into individual commutator segments.

4 Claims, 3 Drawing Sheets

FIG. 4
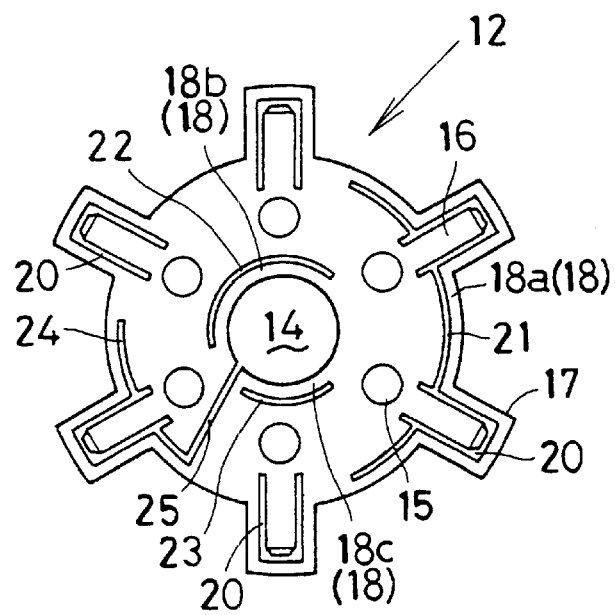
FIG. 5A    FIG. 5B
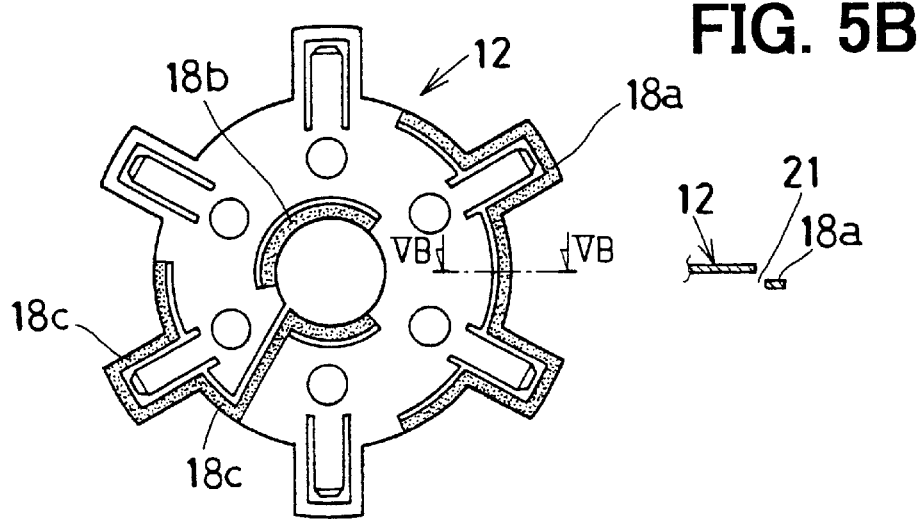

COMMUTATOR FOR ELECTRIC ROTARY MACHINE AND MANUFACTURING METHOD THEREOF

CROSS-REFERENCE TO RELATED APPLICATION

This application is based upon and claims benefit of priority of Japanese Patent Application No. 2001-58721 filed on Mar. 2, 2001, the content of which is incorporated herein by reference.

BACKGROUND OF THE INVENTION

1. Field of the Invention

The present invention relates to a commutator for an electric rotary machine, and more particularly to a commutator in which commutator segments positioned symmetrically with respect to a rotor shaft center are electrically connected to each other through a connecting member.

2. Description of Related Art

A commutator of this type is disclosed in JP-A-11-187622 and JP-A-11-187623. Even number of commutator segments (more than four) are cylindrically disposed around a rotor shaft, and commutator segments positioned symmetrically with respect to the rotor shaft, forming pairs of commutator segments, are electrically connected through connecting members. Each connecting member includes a pair of terminals, each connected to each segment, and a ring-shaped conductor portion connecting the pair of terminals. The pair of terminals and the ring-shaped conductor portion are integrally formed.

In such a commutator, it is necessary to provide a number of connecting members corresponding to a number of segment pairs because each pair of commutator segments is connected through a separate connecting member. For example, if a commutator has six commutator segments, three connecting members are necessary. Therefore, a larger number of connecting members are required as the number of segments become larger, and accordingly the commutator size becomes large and its manufacturing cost becomes high.

In a commutator in which segments are cylindrically disposed on an outer periphery of the commutator, it is possible to provide a large number of connecting members because an axial length of the commutator is long enough to accommodate the large number of connecting members. However, in a commutator in which segments are positioned on an end surface perpendicular to the rotor shaft, it is difficult to accommodate a large number of connecting members in a commutator because its axial length is short.

SUMMARY OF THE INVENTION

The present invention has been made in view of the above-mentioned problem, and an object of the present invention is to provide an improved commutator in which each pair of segments positioned symmetrically with respect to a rotor shaft are electrically connected to each other in a simple manner without enlarging the commutator size.

A commutator having even number (2n) of commutator segments is mounted on a rotor of an electric rotary machine such as a direct current motor. The commutator segments are electrically insulated from one another. The 2n commutator segments form n pairs of commutator segments, each pair consisting of two segments positioned symmetrically with respect to the rotor axis. The commutator segments in each pair are electrically connected to each other. The commutator segments are disposed on a rotor end surface which is perpendicular to the rotor axis. Alternatively, the commutator segments may be cylindrically disposed around the rotor axis.

The commutator is manufactured by integrally molding a metallic base plate and a segment plate made of carbon with a resin material and by forming slits for separating individual commutator segments. The commutator segments are electrically insulated from one another, while the commutator segments belonging to each pair are electrically connected through respective connecting portions formed integrally with the metallic base plate. N connecting portions are formed on the metallic base plate before the metallic base plate is molded together with the segment plate. The connecting portions are depressed from a surface of the metallic base plate by a distance larger than a thickness of the metallic base plate, so that they are not separated in the process of making the separating slits.

Since the n connecting portions are formed on the metallic base plate, the electrical connection of two commutator segments in each pair is easily made without providing separate n pieces of connecting members. Further, the 2n commutator segments are separated from a single segment plate by the separating slits. Therefore, the commutator is made compact and is manufactured in a simple and inexpensive process.

Other objects and features of the present invention will become more readily apparent from a better understanding of the preferred embodiment described below with reference to the following drawings.

BRIEF DESCRIPTION OF THE DRAWINGS

FIG. 4 is a plan view showing a metallic base plate used in the commutator, the metallic base plate having various slits punched by press-work;

FIG. 5A is a plan view showing the metallic base plate having three connecting portions depressed;

FIG. 5B is a partial cross-sectional view showing a depressed connecting portion, taken along line VB—VB in FIG. 5A;

DETAILED DESCRIPTION OF THE PREFERRED EMBODIMENT

Figure 1:
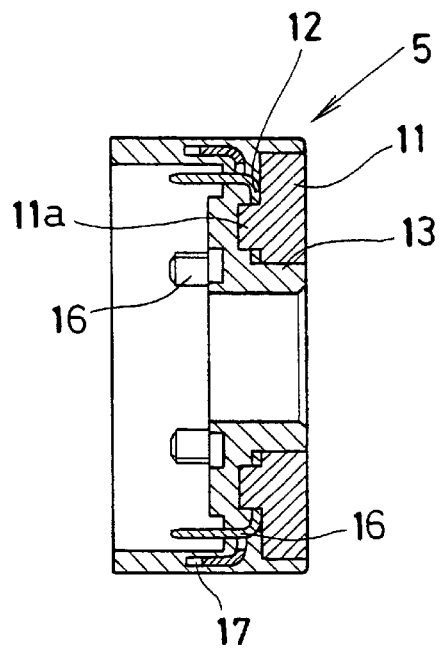
FIG. 1 is a cross-sectional view showing a commutator according to the present invention.

A preferred embodiment of the present invention will be described with reference to the accompanying drawings. First, referring to FIGS. 1–3, a structure of a commutator to be mounted on a rotor of an electric rotary machine will be described. The commutator 5 shown in FIG. 1 is mounted on a rotor 1 shown in FIG. 2. The rotor 1 is used in a direct current motor which is integrally assembled in an in-tank fuel pump.

Figure 2:
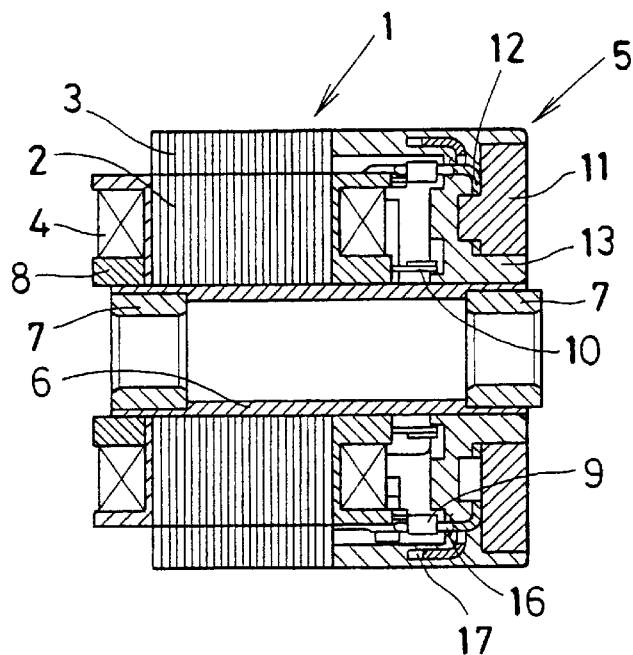
FIG. 2 is a cross-sectional view showing a rotor having the commutator shown in FIG. 1.

As shown in FIG. 2, the rotor 1 includes an armature core having an inner core 2 and an outer core 3, armature coils 4 wound on the armature core, a commutator 5 and other components. A center pipe 6 is press-fitted into inner bores of the armature core and the commutator 5. A pair of bearings 7 are connected to both ends of the center pipe 6. The rotor 1 is rotatably supported by a rotor shaft (not shown) via the pair of bearings 7.

Figure 3:
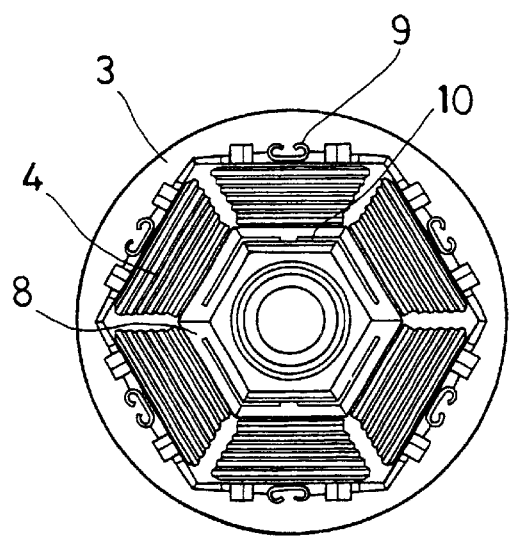
FIG. 3 is a plan view showing an axial end of the rotor shown in FIG. 2, the commutator mounted on the rotor being removed.

The armature coils 4 are wound around respective bobbins 8 as shown in FIG. 3, which shows an axial surface of the rotor with the commutator 5 removed. After the armature coils 4 are mounted on the inner core 2, the inner core 2 is press-fitted into an inner bore of the outer core 3. Both ends of each armature coil 4 are electrically connected to bobbin terminals 9 and 10 formed on the bobbin 8, respectively, as shown in FIG. 3. Commutator terminals 16 (explained later) are inserted into the bobbin terminals 9 and electrically connected thereto, as shown in FIG. 2. Neighboring three armature coils 4 are electrically connected by connecting the bobbin terminals 10 corresponding to those armature coils 4.

As shown in FIG. 1, the commutator 5 is composed of 2n commutator segments 11 (n is an integer, three in this particular embodiment), a metallic base plate 12 on which the commutator segments 11 are mounted and a commutator case 13 which integrally molds the commutator segments 11 and the metallic base plate 12. The center pipe 6 is inserted into the inner bore of the commutator 5, as shown in FIG. 2, and thus the commutator 5 is assembled to the rotor 1. An commutating surface of the commutator 5 is positioned on an end surface perpendicular to the rotor shaft, so that brushes contact the commutator surface in the axial direction.

Now, referring to FIGS. 4–7, the structure and the manufacturing method of the commutator 5 will be described in detail. The commutator 5 is manufactured by integrally molding a stamped metallic base plate 12 and segment plate made of carbon with a resin material forming the commutator case 13. After the metallic base plate 12 and the segment plate are molded together, the segment plate is separated into individual commutator segments 11.

FIG. 4 shows the metallic base plate 12 punched out by press-work. In the punching process, various slits and holes are formed as shown in FIG. 4. A center hole 14 is formed at the center of the metallic base plate 12, and six holes 15 for fixing the segment plate are positioned around the center hole 14. Six commutator terminals 16 and anchor portions 17 are formed outside of each fixing hole 15. Three connecting portions 18 consisting of a first connecting portion 18a, a second connecting portion 18b and a third connecting portion 18c are also formed. Three connecting portions 18a, 18b and 18c are shown as shaded portions in FIG. 5A.

Figure 7:
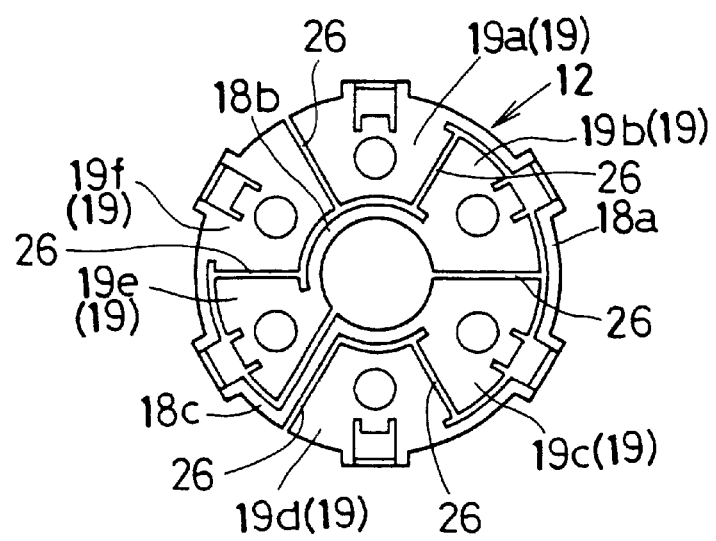
FIG. 7 is a plan view showing the metallic base plate with slits for separating individual segments formed thereon.

The holes 15 for fixing the segment plate to the metallic base plate 12 are formed, so that they are positioned substantially at a center of each segment base 19a–19f shown in FIG. 7. Each segment base 19a–19f electrically contacts each commutator segment 11 when the segment plate is connected to the metallic plate 12 and separated into individual commutator segments by slits 26 formed in a process explained later. The commutator terminals 16 are formed at six positions equally spaced, so that they extend outwardly from an outer circular fringe of the metallic base plate 12. Each of six anchor portions 17 is formed to circumscribe each commutator terminal 16, separated from the commutator terminal 16 by a slit 20. The anchor portions 17 are embedded in the commutator case 13 when molded, as shown in FIG. 1.

The first, second and third connecting portions 18a, 18b, 18c (portions shaded in FIG. 5A) will be explained with reference to FIGS. 4, 5A and 7. In FIG. 7, six segment bases 19, i.e., a first segment base 19a, a second segment base 19b, a third segment base 19c, a fourth segment base 19d, a fifth segment base 19e and sixth segment base 19f, are positioned clockwise in this order. The first connecting portion 18a serves to electrically connects the first segment base 19a to the fourth segment base 19d. The first connecting portion 18a is formed along an outer periphery of the second segment base 19b and the third segment base 19c including two anchor portions 17, and is electrically insulated from those segment bases 19b, 19c by an arcuate slit 21 and terminal slits 20.

The second connecting portion 18b serves to electrically connects the second segment base 19b to the fifth segment base 19e. The second connecting portion 18b is formed along an inner periphery of the first segment base 19a and the sixth segment base 19f, and is electrically insulated from those segment bases 19a, 19f by an arcuate slit 22. The third connecting portion 18c serves to electrically connects the third segment base 19c to the sixth segment base 19f. The third connecting portion 18c is formed along an inner periphery of the fourth segment base 19d, on an inside portion of the fifth segment base 19e and along an outer periphery of the fifth segment base 19e including the anchor portion 17. The third connecting portion is electrically insulated from the fourth segment base 19d and the fifth segment base 19e by the following slits: an arcuate slit 23 formed along an inner periphery of the fourth segment base 19d, an arcuate slit 24 formed along an outer periphery of the fifth segment base 19e and a straight slit 25 connecting the center hole 14 and one end of the arcuate slit 24.

Figure 6:
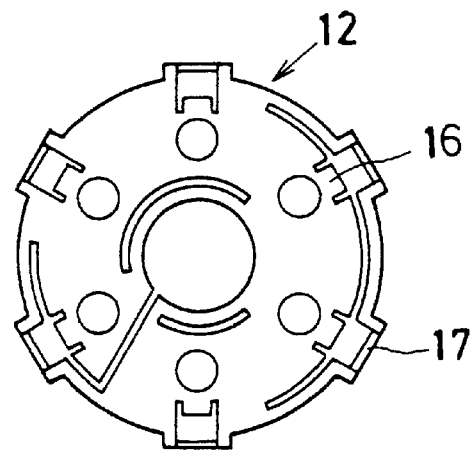
FIG. 6 is a plan view showing the metallic base plate with commutator terminals and anchor portions bent from a front surface of the metallic base plate.

After the metallic base plate 12 shown in FIG. 4 is punched by press-work, the first, second and third connecting portions 18a, 18b 18c (shaded portions in FIG. 5A) are depressed downwardly (toward a rear surface of the drawing sheet), as shown in FIG. 5B. The connecting portions are depressed in an amount exceeding a thickness of the metallic base plate 12. Then, as shown in FIG. 6, the commutator terminals 16 and the anchor portions 17 are bent downwardly (toward a rear surface of the drawing sheet) by 90 degrees. Then, the segment plate made of carbon having six projections 11a (shown in FIG. 1) is mounted on the metallic base plate 12. The segment plate is firmly fixed to the metallic base plate 12 by press-fitting the projections 11a of the segment plate into the fixing holes 15 of the metallic base plate 12.

Then, the metallic base plate 12 and the segment plate connected to each other are integrally molded by resin, thereby forming a molded single body, as shown in FIG. 1. Finally, as shown in FIG. 7, slits 26 separating the segment plate into individual commutator segments 11 are formed by cutting the segment plate and the metallic base plate 12, so that the slits 26 reach from an upper surface of the segment plate to an bottom surface of the metallic base plate 12. In this slit-cutting process, the connecting portions 18a, 18b 18c are not cut because they are depressed downwardly by a distance exceeding the thickness of the metallic base plate 12. In other words a cutter for forming the slits 26 does not reach the connecting portions 18a, 18b, 18c when it reaches the bottom surface of the metallic base plate 12.

By forming the separating slits 26, the segment plate is separated into individual six pieces of the commutator segments 11, and at the same time the metallic base plate 12 is also separated into six segment bases 19a–19f. The commutator segments 11 are electrically connected to the respective segment bases 19a–19f while commutator segments 11 are electrically insulated from one another by the slits 26. A commutator segment 11 located on the first segment base 19a is electrically connected to a commutator segment 11 located on the fourth segment base 19d through the first connecting portion 18a. A commutator segment 11 located on the second segment base 19b is electrically connected to a commutator segment 11 located on the fifth segment base 19e through the second connecting portion 18b. Similarly, a commutator segment 11 located on the third segment base 19c is electrically connected to a commutator segment 11 located on the sixth segment base 19f through the third connecting portion 18c.

In short, the commutator segments 11 are insulated from one another by the separating slits 26, while each pair of commutator segments, positioned symmetrically with respect to the center axis of the commutator 5, are electrically connected to each other through the respective connecting portions 18a, 18b, 18c.

According to the present invention, following advantages are realized. Since the plural connecting portions 18 are formed on a single metallic base plate 12, each pair of commutator segments symmetrically positioned can be easily connected without providing connecting members separated from the metallic base plate 12. This advantage is realized irrespective of the number of commutator segments. Since the connecting portions 18 are depressed from the bottom surface of the metallic base plate 12, the separating slits 26 are easily formed without cutting the connecting portions 18. Since the connecting portions 18 are integrally formed on the metallic base plate, the commutator surface contacting brushes disposed in the axial direction is easily manufactured without increasing the axial length of the commutator. Though the commutating surface is formed on the surface perpendicular to the axial direction of the rotor shaft in the embodiment described above, the present invention is also applicable to a commutator having a cylindrical commutating surface.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A commutator mounted on a rotor of an electric rotary machine, the commutator comprising:

2n commutator segments, it being an integer;

2n segment bases formed by separating a metallic base plat, each segment base contacting each commutator segment, the 2n segment bases being insulated from one another by slits formed on the metallic base plate wherein:

the 2n commutator segments are electrically insulated from one another;

the 2n commutator segments form n pairs of commutator segments, the commutator segments in each pair being positioned symmetrically with respect to an axis of the rotor; and the commutator segments in each pair are electrically connected to each other through a connecting portion formed integrally with the metallic base plate, wherein n pieces of the connecting portions are formed integrally with the metallic base plate, and the n pieces of the connecting portions are all depressed from a metallic base plate surface contacting the commutator segments by a distance exceeding a thickness of the metallic base plate.

2. At the coantator as in claim 1, wherein:

the 2n commutator segments form a commutating surface in a plane perpendicular to the rotor axis, so that brushes contact the commutating surface in a direction of the rotor axis.

3. A method of manufacturing a commutator mounted on a rotor of an electric rotary machine, the commutator having commutator segments and segment bases for mounting the commutator segments thereon, the method comprising:

preparing a metallic base plate for forming the commutator bases, the metallic base plate having a plurality of slits for forming connecting portions each of which electrically connects a pair of the commutator segments located symmetrically with respect to an axis of the rotor;

depressing the connecting portions by an amount larger than a thickness of the base plate;

preparing a segment plate for toning the commutator segments;

mounting the sequent plate on the metallic base plate so that both plates are mechanically and electrically connected to each other; and forming separating slits through the connected metallic base plate and the segment plate to insulate the commutator segments from one another, the separating slits being formed so that the separating slits do not reach the depressed connecting portions.

4. The method of manufacturing a commutator as in claim 3, wherein:

the segment plate is made of carbon; and the metallic base plate and the segment plate are connected by inserting projections formed on the segment plate into holes farmed on the metallic base plate.

* * * * *